(12) United States Patent
Chang

(10) Patent No.: US 12,015,348 B2
(45) Date of Patent: Jun. 18, 2024

(54) CONTROL CIRCUIT FOR ADAPTIVE NOISE MARGIN CONTROL FOR A CONSTANT ON TIME CONVERTER

(71) Applicant: ELITE SEMICONDUCTOR MICROELECTRONICS TECHNOLOGY INC., Hsinchu (TW)

(72) Inventor: Yao-Ren Chang, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 191 days.

(21) Appl. No.: 17/892,154

(22) Filed: Aug. 22, 2022

(65) Prior Publication Data

US 2024/0063717 A1   Feb. 22, 2024

(51) Int. Cl.
*H02M 3/158*   (2006.01)

(52) U.S. Cl.
CPC .................................. *H02M 3/158* (2013.01)

(58) Field of Classification Search
CPC ....................................................... H02M 3/158
See application file for complete search history.

(56) References Cited

U.S. PATENT DOCUMENTS

| | | | |
|---|---|---|---|
| 6,058,030 A | 5/2000 | Hawkes et al. | |
| 8,476,882 B2 | 7/2013 | Luo et al. | |
| 2007/0090818 A1 | 4/2007 | Nishimori | |
| 2013/0002223 A1* | 1/2013 | Xi | H02M 3/158 |
| | | | 323/284 |
| 2015/0188433 A1* | 7/2015 | Jiang | H02M 3/156 |
| | | | 323/271 |
| 2017/0070148 A1* | 3/2017 | Yuan | H02M 1/12 |
| 2018/0019671 A1* | 1/2018 | Li | H02M 1/00 |
| 2021/0305899 A1* | 9/2021 | Hsieh | H02M 1/0035 |

* cited by examiner

*Primary Examiner* — Rafael O De Leon Domenech

(57) ABSTRACT

A control circuit for adaptive noise margin control for a constant on time (COT) converter comprises an input reference terminal, amplifier, first switch device, voltage divider, trigger circuit, and output reference terminal. The amplifier has an input terminal coupled to the input reference terminal receiving a reference voltage signal. The first switch device has a control terminal coupled to an output of the amplifier, a first conduction terminal for receiving a voltage source signal, and a second conduction terminal. The voltage divider is coupled to the second conduction terminal and another input terminal of the amplifier. The trigger circuit, coupled to the voltage divider, is for triggering voltage change of a modified reference voltage signal selectively according to a high-side control signal of the COT converter. The output reference terminal coupled to the second conduction terminal outputs the modified reference voltage signal.

17 Claims, 5 Drawing Sheets

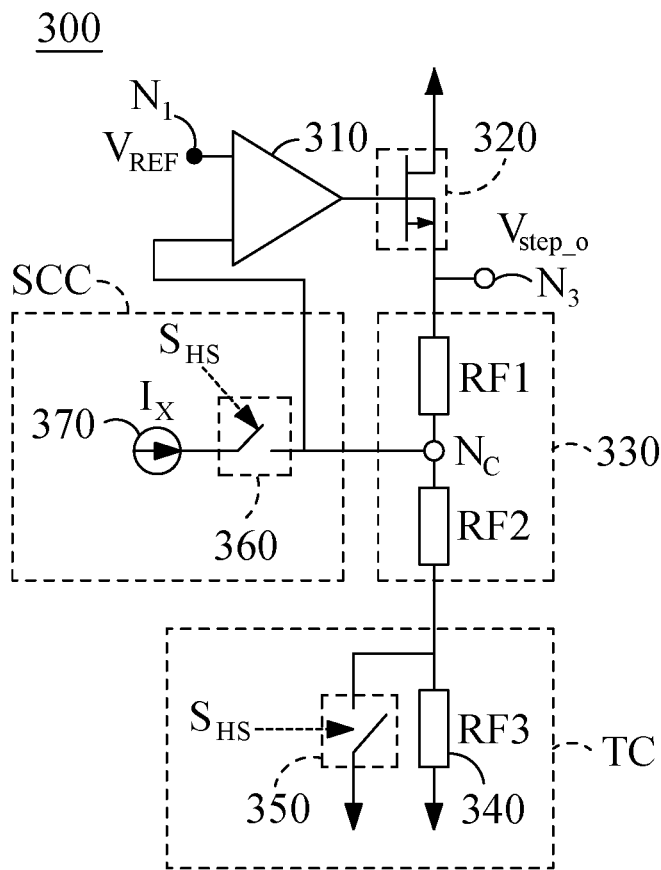
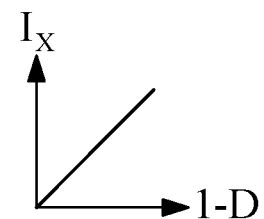
FIG. 3B
FIG. 3A
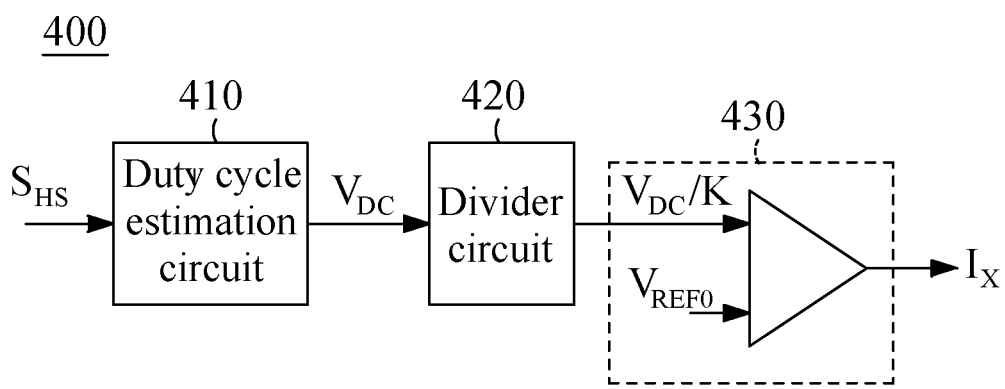
FIG. 4

CONTROL CIRCUIT FOR ADAPTIVE NOISE MARGIN CONTROL FOR A CONSTANT ON TIME CONVERTER

BACKGROUND OF THE INVENTION

1. Field of the Invention

The present disclosure relates to constant on time converters, and in particular to a constant on time (COT) converter control circuit with adaptive noise margin control.

2. Description of the Related Art

With the increasing demand of portable products in recent years, voltage regulators with small size and high performance for providing system power for portable products have become more and more important.

In practical applications, the voltage regulators with constant on-time (COT) control are often used because of several advantages such as simple system structure, fast transient response, and high efficiency at light loads.

However, a conventional constant on-time converter may suffer from an issue of unstable output with respect to fluctuations of the load or noise disturbance especially for the conventional constant on-time converter configured in a higher step-down conversion ratio, such as in a 12 V to 1 V conversion application or a 12-to-1.8 V one, for example. This issue usually indicates that the noise margin of the conventional constant on-time converter is not enough. In this regard, the designer has to tune the circuitry of the conventional constant on-time converter to improve its output stability especially for the conventional constant on-time converter operable for a higher step-down conversion ratio.

BRIEF SUMMARY OF THE INVENTION

An objective of the present disclosure is to provide a control circuit for adaptive noise margin control for a constant on time (COT) converter in order to adaptively control noise margin of the COT converter, thus facilitating output stability.

To achieve at least the above objective, the present disclosure provides a control circuit for adaptive noise margin control for a constant on time (COT) converter, wherein the control circuit comprises an input reference terminal, an amplifier, a first switch device, a voltage divider, a trigger circuit, and an output reference terminal. The input reference terminal of the control circuit is used for receiving a reference voltage signal. The amplifier has a first input terminal coupled to the input reference terminal and has a second input terminal. The first switch device has a control terminal coupled to an output terminal of the amplifier, a first conduction terminal for receiving a voltage source signal, and a second conduction terminal. The voltage divider is coupled to the second conduction terminal and the second input terminal. The trigger circuit, coupled to the voltage divider, for triggering voltage change of a modified reference voltage signal selectively according to a high-side control signal for a high-side switch of the COT converter. The output reference terminal of the control circuit is coupled to the second conduction terminal and used for outputting the modified reference voltage signal based on the reference voltage signal. The output reference terminal is used for being coupled to an input of a comparator of the COT converter.

In an embodiment of the control circuit, the trigger circuit comprises a step resistor coupled to the voltage divider; and a second switch device coupled across the step resistor, wherein the second switch device turns on selectively according to the high-side control signal.

In an embodiment of the control circuit, the output reference terminal is used for being coupled to an input of a pulse width modulation comparator of the COT converter.

In an embodiment of the control circuit, the control circuit further comprises a switching compensation circuit including a compensation switch device and a compensation current source. The compensation switch device is coupled to the voltage divider, wherein the compensation switch device turns on selectively according to the high-side control signal. The compensation current source is coupled to the voltage divider through the compensation switch device selectively. In an embodiment of the control circuit, the compensation current source is used for receiving the high-side control signal and outputting a variable current according to a measure of OFF period as a percentage of a total period for the high-side control signal.

In an embodiment of the control circuit, when the high-side control signal is asserted, the compensation switch device turns on such that the variable current output by the compensation current source flows into the voltage divider.

In an embodiment of the control circuit, the compensation current source comprises: a duty cycle estimation circuit, a divider circuit, and a compensation controller. The duty cycle estimation circuit is used for receiving the high-side control signal and generating a voltage signal indicating a duty cycle of the high-side control signal. The divider circuit is coupled to the duty cycle estimation circuit and configured to output a scaled-down voltage signal according to the voltage signal. The compensation controller is coupled to the divider circuit and configured to output the variable current according to the scaled-down voltage signal.

In an embodiment of the control circuit, the duty cycle estimation circuit includes a low pass filter for receiving the high-side control signal and generating the voltage signal indicating the duty cycle of the high-side control signal.

In an embodiment of the control circuit, the compensation controller includes a voltage to current converter for outputting the variable current according to the scaled-down voltage signal.

To achieve at least the above objective, the present disclosure further provides a control circuit for adaptive noise margin control for a constant on time (COT) converter, wherein the control circuit comprises an input reference terminal, an amplifier, a first switch device, a voltage divider, a switching compensation circuit, and an output reference terminal. The input reference terminal of the control circuit is used for receiving a reference voltage signal. The amplifier has a first input terminal coupled to the input reference terminal and has a second input terminal. The first switch device has a control terminal coupled to an output terminal of the amplifier, a first conduction terminal for receiving a voltage source signal, and a second conduction terminal. The voltage divider is coupled to the second conduction terminal and the second input terminal. The output reference terminal of the control circuit is coupled to the second conduction terminal through a current path and used for outputting a modified reference voltage signal based on the reference voltage signal. The switching compensation circuit includes a plurality of compensation switch devices and a plurality of compensation current sources. Each of the plurality of compensation switch devices turns on selectively according to a corresponding compensation control signal based on the high-side control signal. The plurality of compensation current sources is coupled to the current path through the plurality of compensation switch devices selectively.

In an embodiment of the control circuit, the trigger circuit comprises a step resistor coupled to the voltage divider; and a second switch device coupled across the step resistor, wherein the second switch device turns on selectively according to the high-side control signal.

In an embodiment of the control circuit, the output reference terminal is used for being coupled to an input of a comparator of the COT converter.

In an embodiment of the control circuit, each of the plurality of compensation current sources is used for outputting a corresponding constant current.

In an embodiment of the control circuit, the control circuit further comprises a compensation resistor coupled between the second conduction terminal and the output reference terminal.

In an embodiment of the control circuit, when the corresponding compensation control signal is asserted, the corresponding compensation switch device turns on such that the corresponding current source sinks current from the current path.

In an embodiment of the control circuit, the control circuit further comprises a duty cycle estimation circuit, a divider circuit, and a compensation controller. The duty cycle estimation circuit is used for receiving the high-side control signal and generating a voltage signal indicating a duty cycle of the high-side control signal. The divider circuit is coupled to the duty cycle estimation circuit and configured to output a scaled-down voltage signal according to the voltage signal. The compensation controller is coupled to the divider circuit and configured to output the plurality of compensation control signals according to the scaled-down voltage signal.

In an embodiment of the control circuit, the duty cycle estimation circuit includes a low pass filter for receiving the high-side control signal and generating the voltage signal indicating the duty cycle of the high-side control signal.

In an embodiment of the control circuit, the compensation controller includes a plurality of comparators for output the plurality of compensation control signals according to the scaled-down voltage signal and respective compensation reference signals.

BRIEF DESCRIPTION OF THE DRAWINGS

FIG. 3A is a drawing illustrating a control circuit for adaptive noise margin control based on the architecture of the first step generator as shown in FIG. 2A according to an embodiment of the present invention.

FIG. 3B is a graph illustrating the relationship between a variable current and 1-D according to an embodiment of the present invention, wherein D indicates the duty cycle of the high-side control signal.

FIG. 4 is a drawing illustrating a circuit for implementation of the compensation current source of FIG. 3A according to an embodiment of the present invention.

DETAILED DESCRIPTION OF THE INVENTION

To facilitate understanding of the object, characteristics and effects of this present disclosure, embodiments together with the attached drawings for the detailed description of the present disclosure are provided.

The present disclosure provides various embodiments of a control circuit for adaptive noise margin control for a constant on time (COT) converter in order to adaptively control noise margin of the COT converter, thus facilitating output stability, especially for the constant on-time converter operable in a higher step-down conversion ratio.

Figure 1:
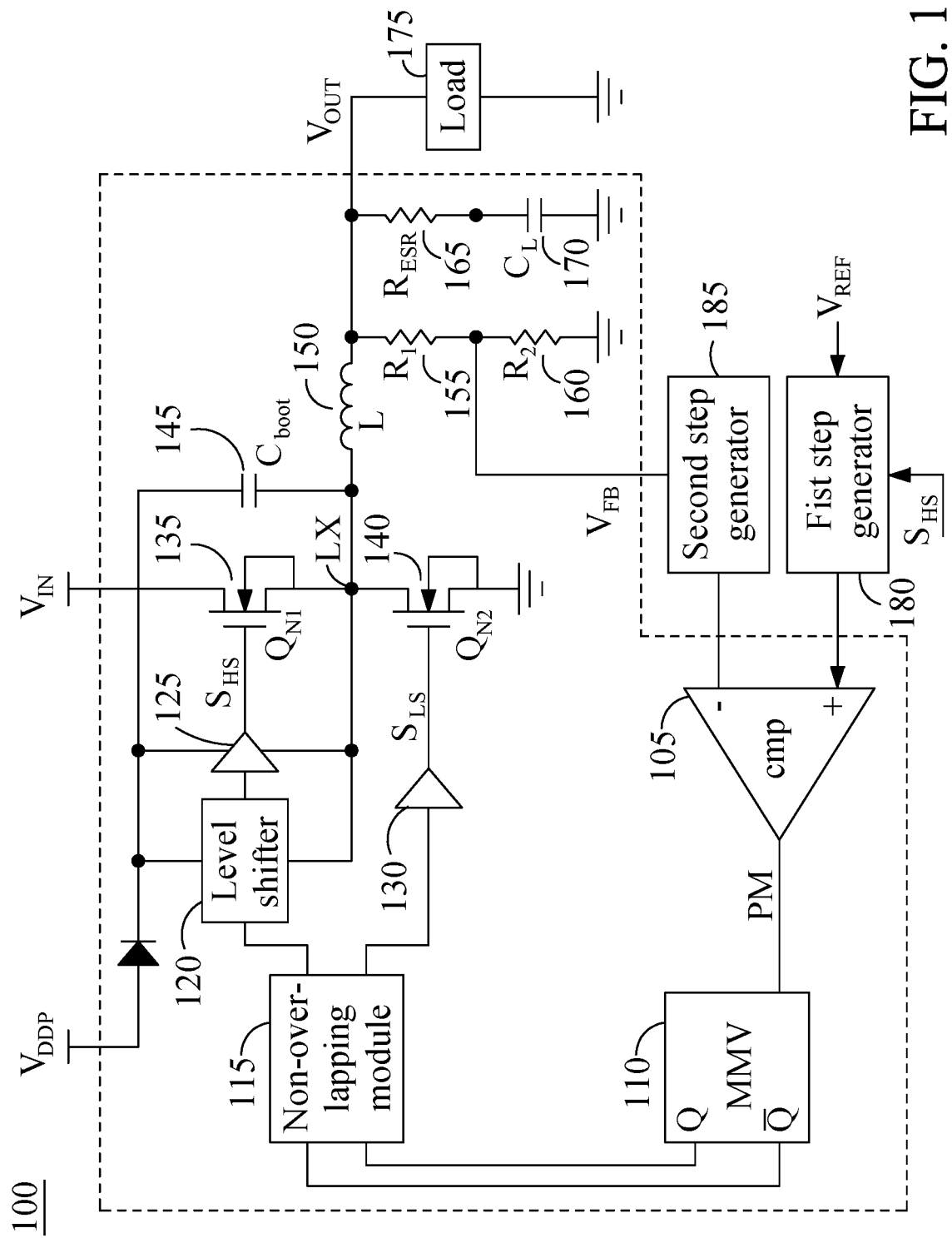
FIG. 1 is a drawing illustrating a constant on-time (COT) converter with control circuit according to an embodiment of the present invention.

Refer to FIG. 1, which is a drawing illustrating a constant on-time (COT) converter with control circuit (100) according to an embodiment of the present invention.

As shown in FIG. 1, the constant on-time (COT) converter 100 provides an output voltage signal $V_{out}$ to a load (Load) 175 according to an input voltage $V_{IN}$. The COT converter 100 comprises a COT converter circuit (as indicated by dashed line) and control circuits for modification of input signals to a comparator 105 (denoted by "cmp"). The control circuits, for example, include a first step generator 180 and a second step generator 185. The first step generator 180 serves as a control circuit for providing a modified reference signal according to a reference voltage signal $V_{REF}$ and a high-side control signal $S_{HS}$ for a high-side switch (such as a first electronic switch ($Q_{N1}$) 135) of the COT converter 100. The second step generator 185 serves as a control circuit for providing a modified feedback signal according to a feedback voltage signal $V_{FB}$ provided internally from the COT converter circuit. For example, the COT converter circuit comprises a comparator 105, a monostable multivibrator (MMV) 110, a non-overlapping module 115, a level shifter 120, a plurality of electronic switches (e.g., 135, 140), and an output stage.

The electronic switches 135 and 140, also known as high-side switch and low-side switch respectively, in an embodiment comprise N-channel metal-oxide-semiconductor field-effect transistors (MOSFET). In other embodiments other types of transistors, MOSFETs, or other electronic switches are utilized.

Following are details describing the structure and architecture of the constant on-time (COT) converter 100 of an embodiment of the present invention illustrated in FIG. 1.

As shown in FIG. 1, the drain of the first electronic switch ($Q_{N1}$) 135 is electrically coupled to an input voltage $V_{IN}$. The source of the second electronic switch ($Q_{N2}$) 140 is connected to ground. The source of the first electronic switch 135 is connected to the drain of the second electronic switch 140.

The output stage comprises an inductor (L) 150, a first resistor ($R_1$) 155, a second resistor ($R_2$) 160, a third resistor ($R_{ESR}$) 165, and a load capacitor ($C_L$) 170. A first end of the inductor 150 is connected to the node created between the first electronic switch 135 and the second electronic switch 140. The second end of the inductor 150 is connected to a first end of the first resistor 155 and the first end of the third resistor 165, and provides the output voltage signal $V_{out}$ to the load (Load) 175. The second end of the first resistor 155 is connected to a first end of the second resistor 160. The second end of the second resistor 160 is connected to ground. The second end of the third resistor 165 is connected to a first end of the load capacitor 170. The second end of the load capacitor 170 is connected to ground.

The node between the first resistor 155 and the second resistor 160 is electrically coupled to a negative input of the comparator (cmp) 105 through the second step generator 185 and provides a feedback voltage signal $V_{FB}$ to the second step generator 185 and the second step generator 185 outputs a modified feedback signal to the comparator 105.

The output of the comparator 105 is electrically connected to an input of the monostable multivibrator (MMV) 110 and provides a pulse width modulation signal (PM) to the monostable multivibrator 110.

The monostable multivibrator 110, for example, can be based on a flip flop, comprising one or two inputs, for example. The output of the comparator 105 can be connected to an input of the monostable multivibrator 110. The monostable multivibrator 110 comprises two outputs Q and $\tilde{Q}$, which is the complement of Q. Both of these outputs Q and $\overline{Q}$ are electrically connected to two inputs of the non-overlapping module 115.

A first output of the non-overlapping module 115 is connected to the input of the level shifter 120. A second output of the non-overlapping module 115 is connected to an input of a second buffer 130. The output of the second buffer 130 is electrically connected to the gate of the second electronic switch 140 and provides a low-side control signal ($S_{LS}$) for controlling the second electronic switch 140 (i.e., the low-side switch).

An input voltage signal $V_{DDP}$ is connected to the anode of a diode and the cathode of the diode is connected to a first terminal of the level shifter 120. A second terminal of the level shifter 120 is connected to the first end of the inductor (L) 150. The output of the level shifter 120 is electrically connected to the input of a first buffer 125. A first terminal of the first buffer 125 is electrically connected to the first terminal of the level shifter 125 and the cathode of the diode. A second terminal of the first buffer 125 is electrically connected to the first end of the inductor 150 and the second terminal of the level shifter 120. The output of the first buffer 125 is electrically connected to the gate of the first electronic switch 135 provides a high-side control signal ($S_{HS}$) for controlling the first electronic switch 135 (i.e., the high-side switch).

This high-side control signal ($S_{HS}$) is also provided to an input of the first step generator 180. A reference voltage signal $V_{REF}$ is provided to another input of the first step generator 180. The output of the first step generator 180 is electrically connected to the positive input of the comparator 105, for example.

A capacitor ($C_{boot}$) 145 is connected between the cathode of the diode and the first end of the inductor 150.

The electronic switches 135 and 140 are controlled to convert the input voltage $V_{IN}$ into the output voltage signal $V_{out}$ by turning the first electronic switch 135 and the second electronic switch 140 on and off.

The first electronic switch 135 is controlled to turn on and to turn off by the output signal of the level shifter 120 via the first buffer 125. The second electronic switch 140 is controlled to turn on and to turn off by the output signal output by the second output of the non-overlapping module 115 via the second buffer 130.

The first step generator 180 utilizes the voltage level of the high-side control signal $S_{HS}$ for the high-side switch (such as a first electronic switch ($Q_{N1}$) 135) of the COT converter 100 and the voltage level of the reference voltage signal $V_{REF}$ and outputs the result (i.e., reference voltage signal) to the positive input of the comparator 105, for example. The second step generator 185 utilizes the voltage level of the feedback voltage signal $V_{FB}$ and outputs the result (i.e., modified feedback voltage signal) to the negative input of the comparator 105, for example. The comparator 105 compares the voltage level of the modified reference voltage signal from the first step generator 180 and the voltage level of the modified feedback voltage signal and outputs a pulse width modulation (PWM) signal (denoted by "PM" in FIG. 1) to the monostable multivibrator 110. The comparator 105 can be also called a pulse width modulation (PWM) comparator of the COT converter 100.

The monostable multivibrator 110 utilizes the signal received from the comparator 105 and generates a signal and its complement and provides these two signals to the non-overlapping module 115.

As a result, the first output signal from the non-overlapping module 115 controls the level shifter 120 to turn the first electronic switch 135 on and off, and the second output signal from the non-overlapping module 115 turns the second electronic switch 140 on and off.

Figure 2A:
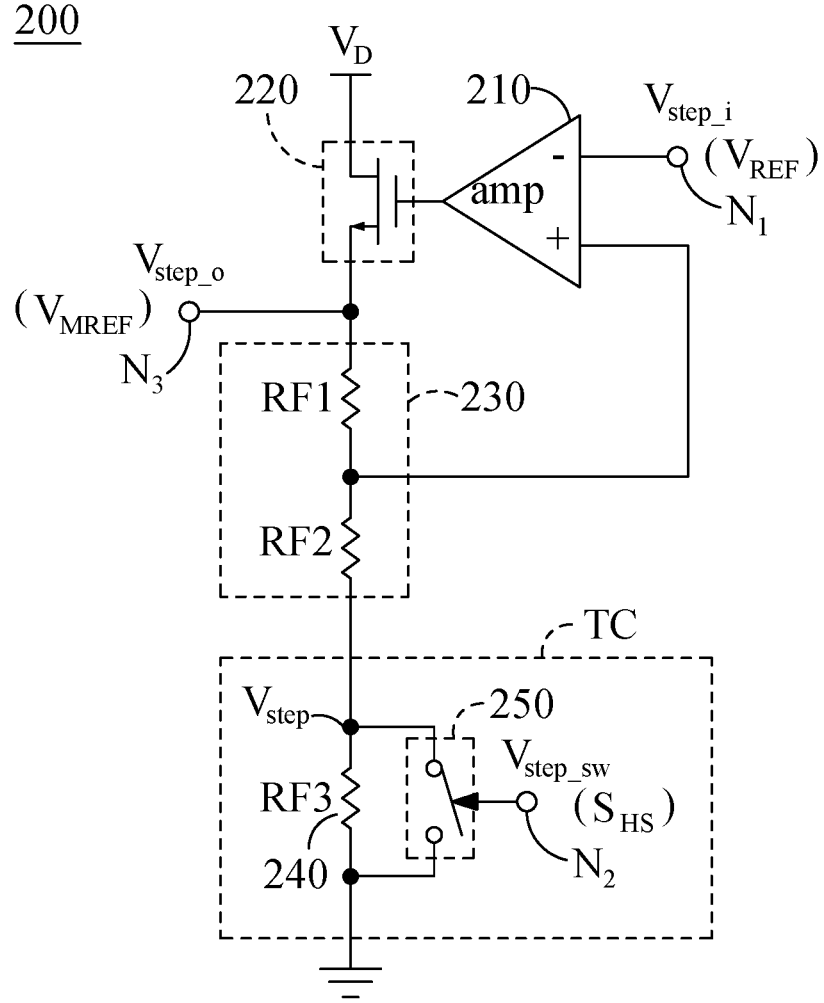
FIG. 2A is a drawing illustrating architecture of a first step generator according to an embodiment of the present invention.

As shown in FIG. 1, the architecture for a COT converter 100 is provided with control circuit for adaptive noise margin control. The first step generator 180 serves as a control circuit for adaptive noise margin control for the COT converter 100. Refer to FIG. 2A, which illustrates a control circuit 200 for implementing a first step generator according to an embodiment of the present invention. The control circuit 200 is an embodiment of the first step generator 180 and comprises an input reference terminal $N_1$, an amplifier 210, a first switch device 220, a voltage divider 230, a trigger circuit TC, and an output reference terminal $N_3$. The input reference terminal $N_1$ of the control circuit 200 is used for receiving a reference voltage signal ($V_{REF}$). The amplifier 210 has a first input terminal coupled to the input reference terminal $N_1$ and has a second input terminal. The first switch device 220 has a control terminal coupled to an output terminal of the amplifier 210, a first conduction terminal for receiving a voltage source signal (e.g., denoted by $V_D$ in FIG. 2A), and a second conduction terminal. The voltage divider 230 is coupled to the second conduction terminal and the second input terminal. For example, as shown in FIG. 2A, the voltage divider 230 includes a resistor RF1 and a resistor RF2, and the second conduction terminal is connected to the resistor RF1 and the second input terminal is connected to the node between the resistor RF1 and resistor RF2. The trigger circuit TC is coupled to the voltage divider 230 and is for triggering voltage change of a modified reference voltage signal (denoted by $V_{MREF}$) selectively according to a high-side control signal (e.g., $S_{HS}$) for a high-side switch (e.g., the first electronic switch 13) of the COT converter (e.g., COT converter 100). The trigger circuit TC, for example, includes a step resistor 240 and a second switch device 250. The step resistor 240, denoted by RF3, is coupled to the voltage divider 230. For example, as shown in FIG. 2A, the step resistor 240 is connected between the resistor RF2 and ground (or another voltage source signal). The second switch device 250 is coupled across the step resistor 240 and has a control terminal $N_2$ for receiving the high-side control signal (e.g., $S_{HS}$) for the high-side switch (e.g., the first electronic switch 13) of the COT converter (e.g., COT converter 100). The second switch device 250 turns on or off selectively according to, for example, the high-side control signal $S_{HS}$. For example, when the high-side control signal $S_{HS}$ is in an ON state (or asserted or indicating an active state), the second switch device 250 turns on; when the high-side control signal $S_{HS}$ is off (or de-asserted or indicating an inactive state), the second switch device 250 turns off. The output reference terminal $N_3$ of the control circuit 200 is coupled to the second conduction terminal and used for outputting the modified reference voltage signal (denoted by $V_{REF}$) based on the reference voltage signal $V_{REF}$. The output reference terminal $N_3$ is used for being coupled to an input of a pulse width modulation (PWM) comparator (e.g., comparator 105) of the COT converter (e.g., COT converter 100).

Figure 2B:
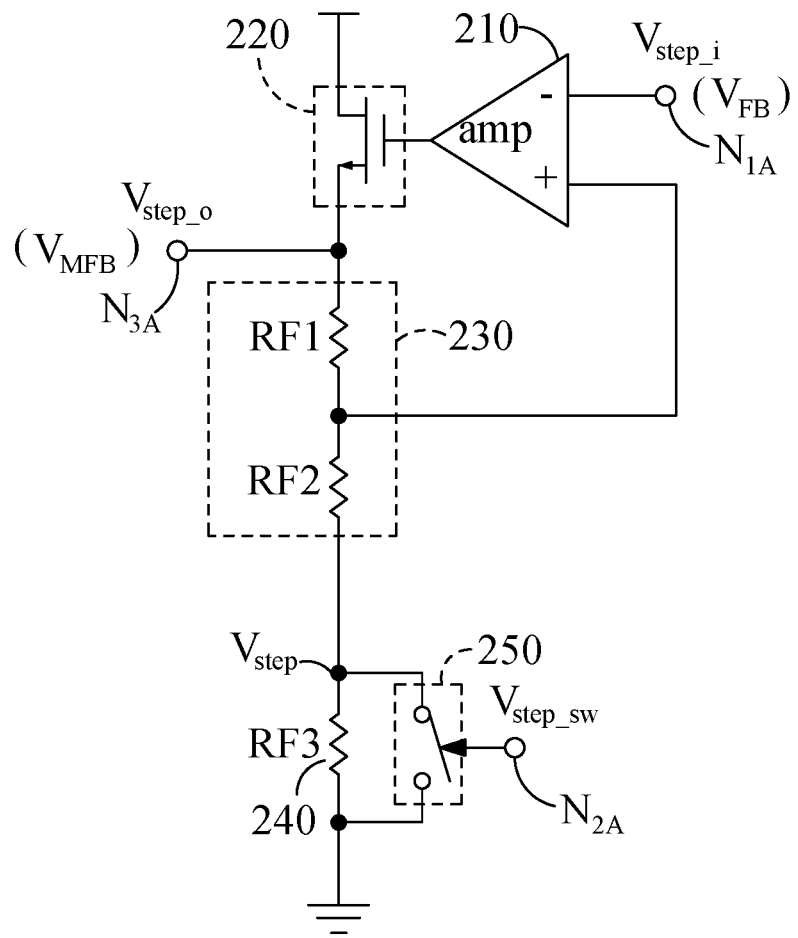
FIG. 2B is a drawing illustrating a second step generator according to an embodiment of the present invention.

Refer to FIG. 2B, which illustrates a control circuit 200A for implementing a second step generator according to an embodiment of the present invention. The control circuit 200A is an embodiment of the second step generator 185 and comprises an input reference terminal $N_{1A}$, an amplifier 210, a first switch device 220, a voltage divider 230, a step resistor 240, a second switch device 250, and an output reference terminal $N_{3A}$. As compared with FIG. 2A, the control circuit 200A is almost the same as the control circuit 200. The control circuit 200A differs from the control circuit 200 in that the input reference terminal $N_{1A}$ of the control circuit 200A is used for receiving a feedback voltage signal ($V_{FB}$), such as the feedback voltage signal $V_{FB}$ obtained internally from the COT converter 100, in FIG. 1. In addition, the output reference terminal $N_{3A}$ of the control circuit 200A is used for outputting a modified feedback voltage signal (denoted by $V_{MFB}$) based on the feedback voltage signal $V_{FB}$. The output reference terminal $N_3$ is used for being coupled to another input of a pulse width modulation (PWM) comparator (e.g., comparator 105) of the COT converter (e.g., COT converter 100). In particular, the second switch device 250 coupled across the step resistor 240 is made opened or turned off. To this end, the control terminal $N_{2A}$ of the second switch device 250 does not need to receive any control signal, or the second switch device 250 as illustrated in FIG. 2B can be omitted. Alternatively, the second switch device 250 of the control circuit 200A can be made in off state in any appropriate manner.

As mentioned above, the architecture for the COT converter 100 in FIG. 1 is provided with a control circuit for adaptive noise margin control. As mentioned above, a conventional constant on-time converter may suffer from an issue of unstable output especially for the conventional constant on-time converter configured in a higher step-down conversion ratio, such as in a 12 V to 1 V conversion application or a 12-to-1.8 V one, for example. In this regard, for a conventional COT converter, without any control circuit (e.g., 180 and 185 in FIG. 1), the higher the step-down conversion ratio, the smaller the duty cycle. A smaller duty cycle may lead to the noise margin being inadequate, thus causing output instability. Conversely, the lower the step-down conversion ratio (e.g., 12-to-5 V, 12-to-3.3 V), the greater the duty cycle, thus causing the output to be more stable.

The issue of unstable output especially for a constant on-time converter configured in a higher step-down conversion ratio can be improved by producing a variable reference signal for a PWM comparator (e.g., comparator 105) of the COT converter (e.g., COT converter 100) with a step generator (e.g., first step generator 180) that generates a ripple in a switching manner according to the high-side control signal of the COT converter. Referring to FIG. 2A, in an embodiment of the first step generator 180, the trigger circuit TC is configured to trigger the voltage change of the voltage $V_{step\_o}$ at the output reference terminal $N_3$ of the first step generator 180 according to the switching of the high-side control signal $S_{HS}$ of the COT converter. For example, when the voltage $V_{step\_sw}$ at the control terminal $N_2$ (e.g., high-side control signal $S_{HS}$) is in an ON state, the second switch device 250 of the trigger circuit TC turns on and the voltage $V_{step}$ is nearly reduced to the ground. When the voltage $V_{step\_sw}$ at the control terminal $N_2$ (e.g., high-side control signal $S_{HS}$) changes from an ON state to an OFF state, the second switch device 250 of the trigger circuit TC turns off and the voltage $V_{step}$ increases. In this manner, The increase in the voltage $V_{step}$ of the trigger circuit TC causes the decrease in the voltage $V_{step\_o}$ at the output reference terminal $N_3$. That is, the voltage level of the modified reference voltage signal $V_{MREF}$ will decrease. In this case, the PWM comparator (e.g., comparator 105) can produce a ripple signal accordingly. As a result, the noise margin of the COT converter 100 can be widened.

Certainly, the implementation of the trigger circuit TC used in the first step generator (e.g., 180 of FIG. 2A) is not limited to the examples, and the trigger circuit TC or its functionality can be implemented by using any appropriate circuit to trigger the voltage change of the output voltage (e.g., $V_{step\_o}$) of the first step generator according to the switching of the high-side control signal $S_{HS}$ of the COT converter.

In order to improve the transient response (e.g., a load current changing in a step manner) of the COT converter which uses the step generator to widen the noise margin as illustrated in the above embodiments, adaptively modifying the reference voltage signal $V_{REF}$ of a PWM comparator of the COT converter in a switching manner according to the high-side control signal can be further implemented. The following provides various embodiments of the first step generator in this regard.

Refer to FIG. 3A, which illustrates a control circuit 300 for adaptive noise margin control based on the architecture of the first step generator as shown in FIG. 2A according to an embodiment of the present invention. As shown in FIG. 3A, the control circuit 300 for adaptive noise margin control for the COT converter is provided. The control circuit 300 is an embodiment of the first step generator 180 and comprises an input reference terminal $N_1$, an amplifier 310, a first switch device 320, a voltage divider 330, a trigger circuit TC, a switching compensation circuit SCC, and an output reference terminal $N_3$. The input reference terminal $N_1$ of the control circuit 300 is used for receiving a reference voltage signal $V_{REF}$. The amplifier 310 has a first input terminal coupled to the input reference terminal $N_1$ and has a second input terminal. The first switch device 320 has a control terminal coupled to an output terminal of the amplifier 310, a first conduction terminal for receiving a voltage source signal, and a second conduction terminal. The voltage divider 330 is coupled to the second conduction terminal and the second input terminal. The trigger circuit TC includes a step resistor 340 and a second switch device 350. The step resistor 340 is coupled to the voltage divider 330. The second switch device 350 is coupled across the step resistor 340, wherein the second switch device 350 turns on selectively according to a high-side control signal (e.g., $S_{HS}$) for a high-side switch of the COT converter (e.g., COT converter 100). The switching compensation circuit SCC includes a compensation switch device 360 and a compensation current source 370. The compensation switch device 360 is coupled to the voltage divider 330, wherein the compensation switch device 360 turns on selectively according to the high-side control signal (e.g., $S_{HS}$). The compensation current source 370 is coupled to the voltage divider 330 through the compensation switch device 360 selectively. For example, the compensation switch device 360 is connected between the compensation current source 370 and a node $N_C$ of the voltage divider 330, wherein the node $N_C$ is between resistors RF1, RF2 of the voltage divider 330 and is connected to the second input terminal of the amplifier 310. The output reference terminal $N_3$ of the control circuit 300 is coupled to the second conduction terminal and used for outputting a modified reference voltage signal based on the reference voltage signal $V_{REF}$. For example, the output reference terminal $N_3$ is used for being coupled to an input of a pulse width modulation comparator (e.g., comparator 105) of the COT converter.

The control circuit 300 in FIG. 3A operates in a similar manner as the control circuit 200 in FIG. 2A when the second switch device 350 and the compensation switch device 360 are turned off according to an OFF state of the high-side control signal $S_{HS}$. When the second switch device 350 and the compensation switch device 360 are turned on according to an ON state of the high-side control signal $S_{HS}$, the control circuit 300 in FIG. 3A outputs the modified reference voltage signal according to the reference voltage signal $V_{REF}$ and a current provided by the compensation current source 370. The switching compensation circuit SCC is configured to provide the current adaptively in order to improve the transient response (e.g., a load current changing in a step manner) of the COT converter (e.g., COT converter 100) which uses the first step generator to widen the noise margin.

In an embodiment of the control circuit 300, the compensation current source 370 is used for receiving the high-side control signal and outputting a variable current (e.g., denoted by Ix) according to a measure of OFF period as a percentage of a total period for the high-side control signal. That is, the variable current Ix is output according to 1-D, where D indicates the duty cycle for the high-side control signal and the duty cycle equates an ON period $T_{ON}$ plus OFF period $T_{OFF}$, i.e. $D=T_{ON}+T_{OFF}$. For example, the variable current Ix can be implemented in proportion to 1-D (or in inverse proportion to D). Refer to FIG. 3B, which is a graph illustrating the relationship between a variable current Ix and 1-D according to an embodiment of the present invention. In an embodiment, the compensation current source 370 can be implemented to output a variable current Ix according to the following formula (1):

$$Ix=(T_{OFF}/T_P)*(VREF/(R_{RF2}+R_{RF3}))*(1/K).$$

In the formula (1), $T_{OFF}$ denotes an OFF period of a total period $T_P$ (i.e., duty cycle D) for the high-side control signal, $V_{REF}$ denotes the voltage level of the reference voltage signal $V_{REF}$, $R_{RF2}$ and $R_{RF3}$ denote the resistance values of the resistors RF2, RF3 of the voltage divider 330, and K denotes a parameter. For example, K can be set to a value between 5 to 10 and other values can also be used whenever appropriate. When K is set to a smaller value, the variable current Ix can be increased and thus the modified reference voltage signal at the output reference terminal $N_3$ is decreased. When K is set to a larger value, the variable current Ix can be decreased and thus the modified reference voltage signal at the output reference terminal $N_3$ is increased.

When the high-side control signal $S_{HS}$ is in an ON state (or asserted or indicating an active state), the compensation switch device 360 turns on such that the variable current Ix output by the compensation current source 370 flows into the node $N_C$ of the voltage divider 330. Consequently, the modified reference voltage signal output by the control circuit 300 of FIG. 3A is smaller than that output by the control circuit 200 of FIG. 2A. Further, in an embodiment, because the variable current Ix can be implemented in proportion to 1-D, the control circuit 300 can output the modified reference voltage signal to adaptively control the noise margin of the COT converter 100 that uses the control circuit 300 as the first step generator 180. When the duty cycle D is larger (e.g., for a lower step-down conversion ratio), the noise margin can be widened in a smaller level and when the duty cycle D is smaller (e.g., for a higher step-down conversion ratio), the noise margin can be widened in a greater level. In this manner, the compensation current source 370 can be implemented to provide the variable current Ix adaptively in proportion to 1-D in order to improve the transient response (e.g., a load current changing in a step manner) of the COT converter (e.g., COT converter 100) which uses the first step generator (e.g., control circuit 300) to widen the noise margin adaptively.

Refer to FIG. 4, which illustrates a circuit 400 for implementation of the compensation current source 370 of the switching compensation circuit SCC of FIG. 3A according to an embodiment of the present invention.

As shown in FIG. 4, in an embodiment, the circuit 400 can be used or based on to implement the compensation current source 370. The circuit 400 comprises a duty cycle estimation circuit 410, a divider circuit 420, and a compensation controller 430. The duty cycle estimation circuit 410 is used for receiving the high-side control signal $S_{HS}$ and generating a voltage signal ($V_{DC}$) indicating a duty cycle of the high-side control signal. The divider circuit 420 is coupled to the duty cycle estimation circuit 410 and configured to output a scaled-down voltage signal (e.g., denoted by $V_{DC}/K$) according to the voltage signal $V_{DC}$. The compensation controller 430 is coupled to the divider circuit 420 and configured to output the variable current Ix according to the scaled-down voltage signal.

In an embodiment, the duty cycle estimation circuit 410 includes a low pass filter for receiving the high-side control signal $S_{HS}$ and generating the voltage signal $V_{DT}$ indicating the duty cycle of the high-side control signal. For example, the voltage signal $V_{DC}$ is a direct current (DC) signal.

In an embodiment, the compensation controller 430 includes a voltage to current converter (e.g., trans-conductance amplifier or voltage controlled current source) for outputting the variable current according to the scaled-down voltage signal. For example, the voltage to current converter can be implemented based on an amplifier having inputs for receiving the voltage signal $V_{DC}$ and a reference voltage $V_{REF0}$ and having an output to the variable current Ix.

Figure 5:
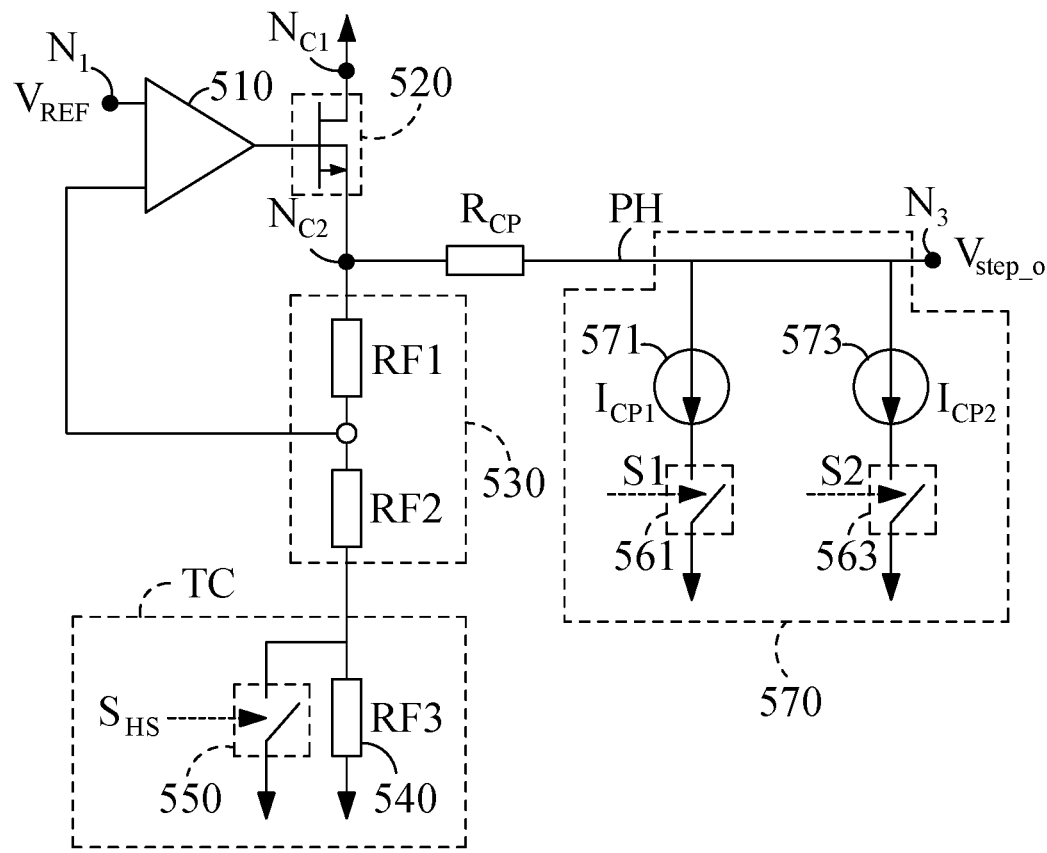
FIG. 5 is a drawing illustrating a control circuit for adaptive noise margin control based on the architecture of the first step generator as shown in FIG. 2A according to another embodiment of the present invention.

Refer to FIG. 5, which illustrates a control circuit 500 for adaptive noise margin control based on the architecture of the first step generator as shown in FIG. 2A according to another embodiment of the present invention. As shown in FIG. 5, the control circuit 500 for adaptive noise margin control for the COT converter is provided. The control circuit 500 is an embodiment of the first step generator 180 and comprises an input reference terminal $N_1$, an amplifier 510, a first switch device 520, a voltage divider 530, a trigger circuit TC, a switching compensation circuit 570, and an output reference terminal $N_3$. The input reference terminal $N_1$ of the control circuit 500 is used for receiving a reference voltage signal $V_{REF}$. The amplifier 510 has a first input terminal coupled to the input reference terminal $N_1$ and has a second input terminal. The first switch device 520 has a control terminal coupled to an output terminal of the amplifier 510, a first conduction terminal $N_{C1}$ for receiving a voltage source signal, and a second conduction terminal $N_{C2}$. The voltage divider 530 is coupled to the second conduction terminal $N_{C2}$ and the second input terminal. The trigger circuit TC includes a step resistor 540 and a second switch device 550. The step resistor 540 is coupled to the voltage divider 530. The second switch device 550 is coupled across the step resistor 540, wherein the second switch device 550 turns on selectively according to a high-side control signal (e.g., $S_{HS}$) for a high-side switch of the COT converter (e.g., COT converter 100). The output reference terminal $N_3$ of the control circuit is coupled to the second conduction terminal $N_{C2}$ through a current path (e.g., denoted by PH) and used for outputting a modified reference voltage signal based on the reference voltage signal $V_{REF}$. The switching compensation circuit 570 includes a plurality of compensation switch devices (e.g., denoted by 561, 563) and a plurality of compensation current sources (e.g., denoted by 571, 573). Each of the plurality of compensation switch devices (e.g., 561, 563) turns on selectively according to a corresponding compensation control signal (e.g., denoted by S1, S2) based on the high-side control signal ($S_{HS}$). The plurality of compensation current sources (e.g., 571, 573) is coupled to the current path (e.g. PH) through the plurality of compensation switch devices selectively. The corresponding compensation control signal, for example, can be implemented by using one or more control signals (e.g., S1, S2) to indicate various switching configurations.

In an embodiment, the output reference terminal $N_3$ is used for being coupled to an input of a pulse width modulation comparator (e.g., comparator 105) of the COT converter (e.g., COT converter 100).

In an embodiment, each of the plurality of compensation current sources (e.g., 571, 573) is used for outputting a corresponding constant current. For example, the compensation current sources 571, 573 output constant currents of $I_{CP1}$ and $I_{CP2}$ respectively. The magnitude of current of $I_{CP1}$ and $I_{CP2}$ can be set to be the same or different.

In an embodiment, the control circuit 500 further comprises a compensation resistor (e.g., denoted by $R_{CP}$) coupled between the second conduction terminal $N_{C2}$ and the output reference terminal $N_3$.

In an embodiment of the control circuit, when the corresponding compensation control signal (e.g., S1, S2) is asserted (or indicating an active state), the corresponding compensation switch device (e.g., 561, 563) turns on such that the corresponding current source (e.g., 571, 573) sinks current from the current path PH. In this manner, the switching compensation circuit 570 including the compensation switch devices (e.g., 561, 563) and corresponding current sources (e.g., 571, 573) can be regarded equivalently as a variable current source that outputs sinks a variable current according to the compensation control signals. For example, when S1 is asserted and S2 is de-asserted, the variable current is $I_{CP1}$. When S1 is de-asserted and S2 is asserted, the variable current is $I_{CP2}$, wherein $I_{CP2}=2*I_{CP1}$. Further, when both S1 and S2 are asserted, the variable current is $I_{CP1}$ plus $I_{CP2}$, i.e., $3*I_{CP1}$. As such, the switching compensation circuit 570 can be implemented as a variable current source sinks current in stepwise according to the compensation control signals (e.g., S1, S2).

Figure 6:
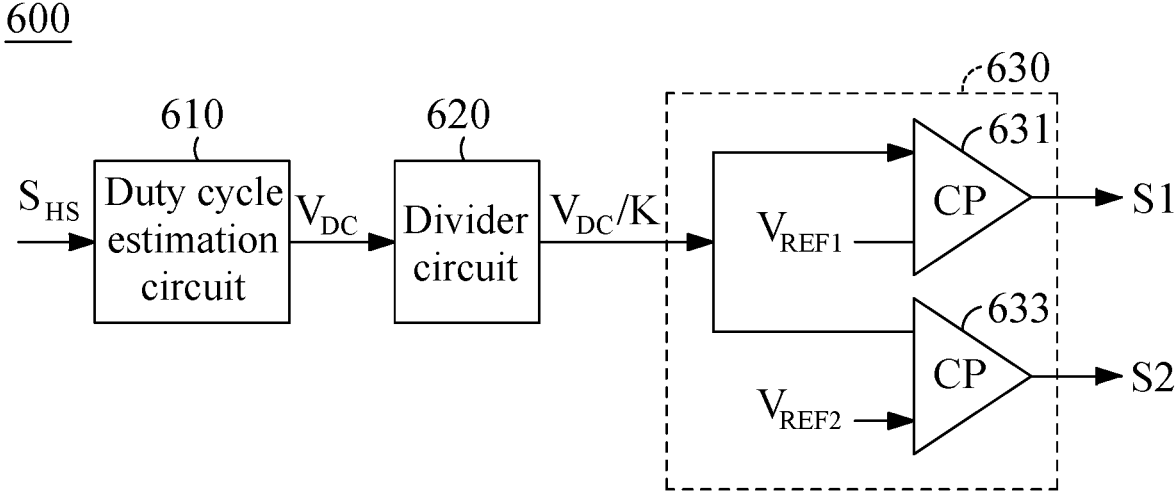
FIG. 6 is a drawing illustrating a circuit for implementation of control the compensation current sources of FIG. 5 according to an embodiment of the present invention.

Refer to FIG. 6, which illustrates a circuit 600 for implementation of controlling the compensation current sources of FIG. 5 according to an embodiment of the present invention. As shown in FIG. 6, in an embodiment, the circuit 600 can be used or based on to implement controlling the compensation current sources of FIG. 5. The circuit 600 comprises a duty cycle estimation circuit 610, a divider circuit 620, and a compensation controller 630. The duty cycle estimation circuit 610 is used for receiving the high-side control signal (e.g., $S_{HS}$) and generating a voltage signal (e.g., denoted by $V_{DC}$) indicating a duty cycle of the high-side control signal (e.g., $S_{HS}$). The divider circuit 620 is coupled to the duty cycle estimation circuit 610 and configured to output a scaled-down voltage signal (e.g., $V_{DC}/K$, K indicating a scale value) according to the voltage signal (e.g., $V_{DC}$). The compensation controller 630 is coupled to the divider circuit 620 and configured to output the plurality of compensation control signals (e.g., S1, S2) according to the scaled-down voltage signal.

In an embodiment of the control circuit, the duty cycle estimation circuit 610 includes a low pass filter for receiving the high-side control signal (e.g., $S_{HS}$) and generating the voltage signal (e.g., $V_{DC}$) indicating the duty cycle of the high-side control signal.

In an embodiment of the control circuit, the compensation controller 630 includes a plurality of comparators (e.g., denoted by 631, 633) for output the plurality of compensation control signals (e.g., S1, S2) according to the scaled-down voltage signal (e.g., $V_{DC}/K$) and respective compensation reference signals (e.g., denoted by $V_{REF1}$, $V_{REF2}$).

For example, $V_{REF1}$ is less than $V_{REF2}$ When the scaled-down voltage signal (e.g., $V_{DC}/K$) is less than or equal to $V_{REF1}$, the comparators 631, 633 output the compensation control signals S1, S2 as de-asserted (e.g., in an OFF state), respectively. When the scaled-down voltage signal (e.g., $V_{DC}/K$) is greater than or equal to $V_{REF1}$ and less than $V_{REF2}$, the comparators 631, 633 output the compensation control signals S1, S2 as asserted and de-asserted (e.g., in an ON state and OFF state), respectively. When the scaled-down voltage signal (e.g., $V_{DC}/K$) is greater than or equal to $V_{REF2}$, the comparators 631, 633 output the compensation control signals S1, S2 as asserted (e.g., in an ON state), respectively.

Certainly, the implementation of the compensation controller 630 is not limited to the examples and other way of generating the compensation control signals can be utilized as embodiments.

In some embodiments, the switching compensation circuit 570 can also include three or more constant current sources and three or more compensation switch devices while the compensation controller 630 can include three or more comparators to generate three or more compensation control signals.

For example, referring to FIGS. 5 and 6, when the high-side control signal $S_{HS}$ is in an ON state (or asserted or indicating an active state), the circuit 600 generates the plurality of compensation control signals (e.g., S1, S2) so as to turn on the plurality of compensation switch devices (e.g., denoted by 561, 563) selectively to sink current from the current path PH, for example, through the compensation resistor $R_{CP}$. Consequently, the modified reference voltage signal output by the control circuit 500 of FIG. 5 is smaller than that output by the control circuit 200 of FIG. 2A. Further, in an embodiment, because the variable current of the switching compensation circuit 570 can be implemented in proportion to 1-D in stepwise manner, the control circuit 500 can output the modified reference voltage signal to adaptively control the noise margin of the COT converter 100 that uses the control circuit 500 as the first step generator 180. When the duty cycle D is larger (e.g., for a lower step-down conversion ratio), the noise margin can be widened in a smaller level and when the duty cycle D is smaller (e.g., for a higher step-down conversion ratio), the noise margin can be widened in a greater level. As a whole, the switching compensation circuit 570 can be implemented to provide the variable current adaptively in proportion to 1-D in stepwise manner in order to improve the transient response (e.g., a load current changing in a step manner) of the COT converter (e.g., COT converter 100) which uses the first step generator (e.g., control circuit 500) to widen the noise margin adaptively.

As a result, the noise margin is adaptively widened and the transient response performance is also improved, thus leading to more stable output for the COT converter.

The switching compensation circuit 570 is able to provide the functionality of the trigger device TC to trigger the voltage change of the output voltage (i.e., $V_{step\_o}$) of the control circuit 500 because the switching compensation circuit 570 can be implemented as a variable current source sinks current in stepwise according to the compensation control signals (e.g., S1, S2), as mentioned above. In addition, the switching compensation circuit 570 can be implemented to provide the variable current adaptively in proportion to 1-D in stepwise manner in order to improve the transient response. For these reasons, in some embodiments, the control circuit illustrated in FIG. 5 can be alternatively implemented without the use of a step resistor 540 and a second switch device 550. In other words, in FIG. 5, the second switch device 550 or both the step resistor 540 and the second switch device 550 can be optional (or omitted) in some implementations of the control circuit 500.

While the present disclosure has been described by means of specific embodiments, numerous modifications and variations could be made thereto by those skilled in the art without departing from the scope and spirit of the present disclosure set forth in the claims.

What is claimed is:

1. A control circuit for adaptive noise margin control for a constant on time (COT) converter, the control circuit comprising:
    an input reference terminal of the control circuit for receiving a reference voltage signal;
    an amplifier having a first input terminal coupled to the input reference terminal and having a second input terminal;
    a first switch device having a control terminal coupled to an output terminal of the amplifier, having a first conduction terminal for receiving a voltage source signal, and having a second conduction terminal;
    a voltage divider coupled to the second conduction terminal and the second input terminal; and
    a trigger circuit, coupled to the voltage divider, for triggering voltage change of a modified reference voltage signal selectively according to a high-side control signal for a high-side switch of the COT converter; and
    an output reference terminal of the control circuit coupled to the second conduction terminal and used for outputting the modified reference voltage signal based on the reference voltage signal, wherein the output reference terminal is used for being coupled to an input of a comparator of the COT converter.

2. The control circuit according to claim 1, wherein the trigger circuit comprises:
    a step resistor coupled to the voltage divider; and
    a second switch device coupled across the step resistor, wherein the second switch device turns on selectively according to the high-side control signal.

3. The control circuit according to claim 1, wherein the control circuit further comprises:
    a switching compensation circuit including:
        a compensation switch device coupled to the voltage divider, wherein the compensation switch device turns on selectively according to the high-side control signal; and
        a compensation current source coupled to the voltage divider through the compensation switch device selectively.

4. The control circuit according to claim 3, wherein the compensation current source is used for receiving the high-side control signal and outputting a variable current according to a measure of OFF period as a percentage of a total period for the high-side control signal.

5. The control circuit according to claim 4, wherein when the high-side control signal is asserted, the compensation switch device turns on such that the variable current output by the compensation current source flows into the voltage divider.

6. The control circuit according to claim 4, wherein the compensation current source comprises:
    a duty cycle estimation circuit for receiving the high-side control signal and generating a voltage signal indicating a duty cycle of the high-side control signal;
    a divider circuit coupled to the duty cycle estimation circuit and configured to output a scaled-down voltage signal according to the voltage signal; and
    a compensation controller coupled to the divider circuit and configured to output the variable current according to the scaled-down voltage signal.

7. The control circuit according to claim 6, wherein the duty cycle estimation circuit includes a low pass filter for receiving the high-side control signal and generating the voltage signal indicating the duty cycle of the high-side control signal.

8. The control circuit according to claim 6, wherein the compensation controller includes a voltage to current converter for outputting the variable current according to the scaled-down voltage signal.

9. A control circuit for adaptive noise margin control for a constant on time (COT) converter, the control circuit comprising:
    an input reference terminal of the control circuit for receiving a reference voltage signal;
    an amplifier having a first input terminal coupled to the input reference terminal and having a second input terminal;
    a first switch device having a control terminal coupled to an output terminal of the amplifier, having a first conduction terminal for receiving a voltage source signal, and having a second conduction terminal;
    a voltage divider coupled to the second conduction terminal and the second input terminal;
    an output reference terminal of the control circuit coupled to the second conduction terminal through a current path and used for outputting a modified reference voltage signal based on the reference voltage signal; and
    a switching compensation circuit including:
        a plurality of compensation switch devices, wherein each of the plurality of compensation switch devices turns on selectively according to a corresponding compensation control signal based on a high-side control signal for a high-side switch of the COT converter; and a plurality of compensation current sources coupled to the current path through the plurality of compensation switch devices selectively.

10. The control circuit according to claim 9, wherein the control circuit further comprises:
   a trigger circuit including:
      a step resistor coupled to the voltage divider; and
      a second switch device coupled across the step resistor, wherein the second switch device turns on selectively according to the high-side control signal.

11. The control circuit according to claim 9, wherein the output reference terminal is used for being coupled to an input of a comparator of the COT converter.

12. The control circuit according to claim 9, wherein each of the plurality of compensation current sources is used for outputting a corresponding constant current.

13. The control circuit according to claim 9, wherein the control circuit further comprises a compensation resistor coupled between the second conduction terminal and the output reference terminal.

14. The control circuit according to claim 9, wherein when the corresponding compensation control signal is asserted, the corresponding compensation switch device turns on such that the corresponding current source sinks current from the current path.

15. The control circuit according to claim 9, wherein the control circuit further comprises:
   a duty cycle estimation circuit for receiving the high-side control signal and generating a voltage signal indicating a duty cycle of the high-side control signal;
   a divider circuit coupled to the duty cycle estimation circuit and configured to output a scaled-down voltage signal according to the voltage signal; and
   a compensation controller coupled to the divider circuit and configured to output the plurality of compensation control signals according to the scaled-down voltage signal.

16. The control circuit according to claim 15, wherein the duty cycle estimation circuit includes a low pass filter for receiving the high-side control signal and generating the voltage signal indicating the duty cycle of the high-side control signal.

17. The control circuit according to claim 15, wherein the compensation controller includes a plurality of comparators for output the plurality of compensation control signals according to the scaled-down voltage signal and respective compensation reference signals.

* * * * *